United States Patent [19]

Zimmer

[11] Patent Number: 4,741,218
[45] Date of Patent: May 3, 1988

[54] MANIPULATOR DRIVE WITH SLIP-ELIMINATING ADJUSTMENT

[75] Inventor: Ernst Zimmer, Friedberg, Fed. Rep. of Germany

[73] Assignee: Kuka Schweissanlagen + Roboter GmbH, Augsburg, Fed. Rep. of Germany

[21] Appl. No.: 880,953

[22] Filed: Jun. 26, 1986

Related U.S. Application Data

[63] Continuation of Ser. No. 587,929, Mar. 9, 1984, abandoned.

[30] Foreign Application Priority Data

Mar. 9, 1983 [DE] Fed. Rep. of Germany ....... 3308413

[51] Int. Cl.$^4$ ............................................. B25J 17/00
[52] U.S. Cl. ..................... 74/89.2; 74/440; 901/21; 901/25; 901/28
[58] Field of Search ............... 414/729, 735, 744 R, 414/4; 901/15, 23, 24, 21, 25, 28; 74/409, 440, 89.16, 479, 89.2, 89.21, 89.22, 421 R, 421 A

[56] References Cited

U.S. PATENT DOCUMENTS

| | | | |
|---|---|---|---|
| 2,868,033 | 1/1959 | Caither | 74/409 |
| 3,037,396 | 6/1962 | Martin | 74/440 |
| 4,072,064 | 2/1978 | Lloyd et al. | 74/409 |
| 4,399,718 | 8/1983 | Zimmer | 901/25 X |

FOREIGN PATENT DOCUMENTS

| | | | |
|---|---|---|---|
| 2483300 | 12/1981 | France | 901/25 |
| 616447 | 2/1961 | Italy | 74/89.16 |
| 560746 | 9/1977 | U.S.S.R. | 901/15 |

Primary Examiner—Robert J. Spar
Assistant Examiner—Donald W. Underwood
Attorney, Agent, or Firm—Karl F. Ross; Herbert Dubno; Andrew Wilford

[57] ABSTRACT

An a manipulator having a pair of main elements pivoted together at a main axis has a drive having a motor mounted on one of the elements and having a motor output, and first, second, and third stepdown transmissions connecting this output with continuous-mesh force transmission to the other element. The first stepdown transmission has an input wheel connected to the motor output, an output wheel, and a toothed belt interconnecting the input and output wheels. The second stepdown transmission has a rotary input element connected to the output wheel, and a rotary output element noncoaxially associated with the input element and connected thereto. The third stepdown transmission has an output gear connected to the other element centered on the main axis, and an input gear rotatable about a gear axis offset from the main axis and having two axially separate halves relatively rotatable about the gear axis and both meshing with the output gear. A shaft has an outer end connected to one of the gear halves and an inner end connected to the output element of the second transmission. A sleeve surrounding the shaft has an outer end connected to the other gear half and an inner end connected to the output element of the second transmission. The sleeve and shaft are of generally the same torsional elasticity between their inner and outer ends. A slip-adjusting unit is effective between the inner ends of the shaft and sleeve for maintaining opposite torsional stresses in the sleeve and shaft.

7 Claims, 3 Drawing Sheets

MANIPULATOR DRIVE WITH SLIP-ELIMINATING ADJUSTMENT

This is a continuation of copending application Ser. No. 587,929 filed on Mar. 9, 1984.

FIELD OF THE INVENTION

The present invention relates to a manipulator drive. More particularly this invention concerns a system for reducing or eliminating slip in the drive train for a joint of such a manipulator.

BACKGROUND OF THE INVENTION

A manipulator has a stationary base on which a carousel is rotatable about a vertical axis by means of a motor mounted on the base. A main support arm is rotatable about a horizontal axis perpendicularly intersecting the vertical axis by means of a motor mounted on the carousel. A counterweight is provided for counterbalancing the offcenter weight of the main arm and the structure carried by it.

The upper end of the main arm carries an outrigger arm rotatable on the main arm about a horizontal axis by means of a motor carried on the main arm. The outer end of this outrigger arm carries a so-called mechanical hand comprising a head rotatable about a head axis perpendicularly intersecting the outrigger-arm axis and carrying in turn a tool holder rotatable on the head about a holder axis perpendicularly intersecting the axis. This holder in turn can rotate a tool about a holder axis perpendicular to the head axis. Drives are provided at the rear end of the outrigger arm for rotation about the various axes.

Such an arrangement is also described in my U.S. Pat. No. 4,548,097. This arrangement has a main support defining a main longitudinal axis, a housing rotatable on the main support about the main longitudinal axis, a head defining a head longitudinal axis and rotatable on the head housing about an outer transverse axis crossing the main longitudinal axis, and a holder rotatable on the head about the head longitudinal axis. Respective housing, head, and holder stepdown drive transmissions have outputs connected directly to the housing, head, and holder and inputs and have stepdown transmission ratios of at least 70:1. Respective head and holder drive trains include respective head and holder right-angle drives having input shafts coaxial with the main longitudinal axis and coaxial output shafts defining an inner transverse axis generally parallel to the outer transverse axis but offset along the main longitudinl axis therefrom toward the support, respective head and holder output members connected to the respective transmission inputs and both rotatable about the outer transverse axis, and respective head and holder connecting elements between the respective output shafts and output members for joint rotation of each output member with the respective output shaft.

A serious problem in such arrangements is accurately driving the joints at least at the so-called main axes, that is those axes relatively close to the stationary base, as any slip or play at these axes is magnified at the tool end. This problem is particularly troublesome when the tool must be moved back and forth, as a transmission that is slipfree in one direction normally slips slightly as it reverses and all the play in it is taken up in the opposite direction.

My earlier U.S. Pat. No. 4,399,718 describes a pivot drive for interconnecting a pair of members that are relatively pivotal about a pivot axis. This drive has a torsion rod extending along a rod axis and rotatable by an appropriate drive relative to one of the members. This rod has outer ends carrying input gears of respective constant-mesh gear trains having output gears at least one of which is limitedly rotatable about the pivot axis on the other member. This one output gear can be limitedly rotated and locked in place in the other member so as torsionally to prestress the rod, thereby in theory eliminating play from the drive by bringing the gears of one of the gear trains into snug contact in one direction and the gears of the other gear train into snug contact in the opposite direction.

This arrangement is unfortunately only effective when coaxial, planetary-gear stepdown transmissions are used. Unfortunately such transmissions are not efficient at large stepdown ratios. In addition it is very expensive and not altogether possible to make such an arrangement equally tight for rotation in either direction, so that some difference in slip is encountered on direction change.

Another solution has been proposed in German Pat. No. 2,226,407 filed 31 May 1972 by Hans Richter. This arrangement uses noncoaxial toothed-belt transmissions. Such construction does indeed permit high stepdown ratios to be achieved with low losses, but these transmissions all have some slip or play. Admittedly the play of the upstream transmissions is reduced with each subsequent stepdown, but that of the furthest downstream transmission is transmitted directly to the output arm.

OBJECTS OF THE INVENTION

It is therefore an object of the present invention to provide an improved manipulator drive.

Another object is the provision of such a manipulator drive which overcomes the above-discussed disadvantages, that is which has very little play, yet which is highly efficient.

A further object is to provide such a drive whose inevitably developing play can be adjusted out.

SUMMARY OF THE INVENTION

A manipulator having a pair of main elements pivoted together at a main axis has a drive according to this invention having a motor mounted on one of the elements and having a motor output, and first, second, and third stepdown transmissions connecting this output with some kind of continuous-mesh force transmission, to the other element. The first stepdown transmission has an input wheel connected to the motor output, an output wheel, and a toothed belt interconnecting the input and output wheels. The second stepdown transmission has a rotary input element connected to the output wheel, and a rotary output element noncoaxially associated with the input element and connected thereto. The third stepdown transmission has an output gear connected to the other element centered on the main axis, and an input gear rotatable about a gear axis offset from the main axis and having two axially separate halves relatively rotatable about the gear axis and both meshing with the output gear. A shaft has an outer end connected to one of the gear halves and an inner end connected to the output element of the second transmission. A sleeve surrounding the shaft has an outer end connected to the other gear half and an inner end connected to the output element of the second transmission. The sleeve and shaft are of generally the same torsional elasticity between their inner and outer ends. A slip-adjusting unit is effective between the inner ends of the shaft and sleeve for maintaining opposite torsional stresses in the sleeve and shaft.

The transmissions are noncoaxial. This makes them relatively bulky, but the bulk is more than outweighed by the higher efficiency, and is not really critical on the main joints of the manipulator. The continuous-mesh gearing of the third transmission permits a relatively large stepdown to be obtained, in much less space than would be needed for a toothed belt transmission that could work with the same stepdown at the same very low speeds.

It is of particular importance with the third-transmission structure according to the invention that the influence of the mass inertia moment I of the part being driven is substantially reduced in this last transmission stage and as a result after this stage only is of reduced effect. This effect is a function of the mathematical recognition that the influence of the mass inertia moment I is reduced with respect to the reciprocal square of the stepdown i, that is the effect of the mass inertia is reduced by the factor $1/i^2$. With several transmissions the factors are multiplicative:

$$1/i_1^2 \cdot 1/i_2^2 \cdot \ldots \cdot 1/i_n^2.$$

Measurements in a four-stage transmission according to this invention, that is where the second transmission has two toothed-belt stages, gives a spring constant $C_{ges}$ for the whole transmission that is 17% smaller than the spring constant $C_{St}$ for the last slip-reduced stage. This means that the toothed-belt transmissions only have a modest influence on the spring constant $C_{ges}$ of the entire transmission.

If one uses however a single last stage compensated for slip according to this invention and only two preceding toothed-belt transmissions, that is a single-stage second transmission, the difference between the spring constants is reduced further yet from that of the four-stage transmission.

Since however the spring constant C has a direct effect on the size of the resonant frequency, which is determined by the formula $$f = \tfrac{1}{2} pi \cdot (C/I)^{\frac{1}{2}},$$

this spring constant is an important factor in the vibrational stiffness of the construction.

The last stage of the transmission according to this invention, if properly lubricated, can go months between servicings when the slip is taken up. As a result of high stiffness, a high resonant frequency exists in the system, causing any oscillations to decay and stop faster than has hitherto been possible.

In addition the system of this invention uses efficient and inexpensive toothed wheel drives in the noncritical upstream transmission stages. The second stage can be a continuous-mesh gear stage instead, but in any situation the first stage according to this invention is formed by a toothed belt transmission.

What is more, the load is not split in the system of this invention. The torsional stresses are applied at a convenient location where resetting them is relatively easy. Due to the similar torsional stiffness of the shaft and sleeve, the drive action will be identical in both directions.

According to another feature of this invention the slip-reducing unit includes a clamping system for tightening the inner ends on each other and for fixing them in the output element of the second transmission. The slip adjustment is effected by formations on the sleeve and shaft adapted to be engaged by torsion-inducing tools. These formations can be simple screw slots.

In addition according to the invention the inner end of the sleeve rides on the inner end of the shaft and the first and second transmissions are on opposite axial sides of the arms and the second and third transmission is on the same axial side of the arms as the second transmission.

DESCRIPTION OF THE DRAWING

The above and other features and advantages will become more readily apparent from the following, reference being made to the accompanying drawing in which.

SPECIFIC DESCRIPTION

Figure 1:
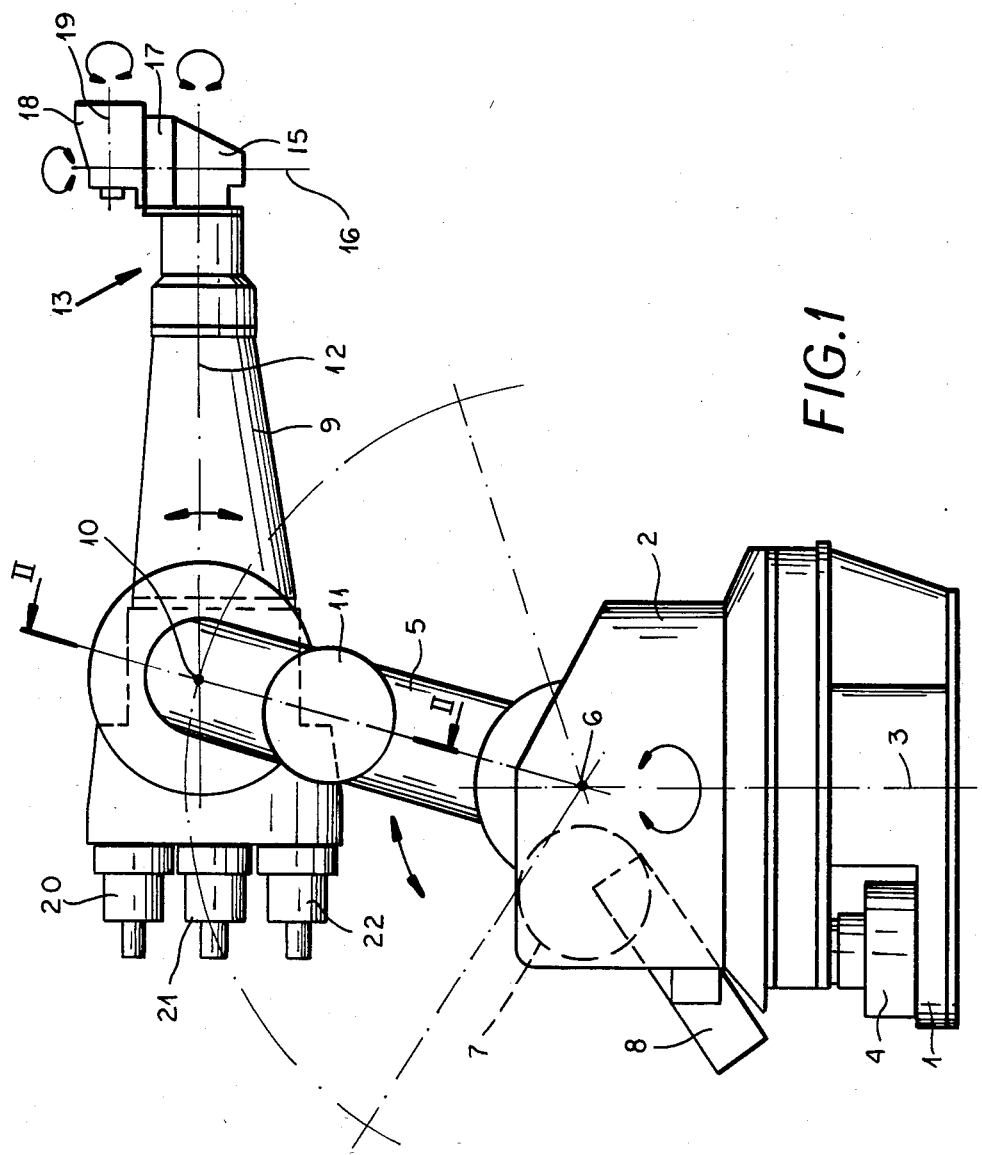
FIG. 1 is a side view of the manipulator according to this invention.

As seen in FIG. 1 a manipulator according to this invention has a stationary base on which a carousel 2 is rotatable about a vertical axis 3 by means of a motor 4 mounted on the base. A main support arm 5 is rotatable about a horizontal axis 6 perpendicularly intersecting the vertical axis 3 by means of a motor 7 mounted on the carousel 2. A counterweight 8 is provided for counterbalancing the offcenter weight of the arm 5 and the structure carried by it.

The upper end of the arm 5 carries an outrigger arm 9 rotatable on the arm 5 about a horizontal axis 10 by means of a motor 11 carried on the arm 5. The axis 10 is parallel to the axis 6. The outer end of this outrigger arm 9 carries a so-called mechanical hand 13 comprising a head 15 rotatable about an axis 12 perpendicularly intersecting the axis 10 and carrying in turn a tool holder 18 rotatable on the head 15 about an axis 16 perpendicularly intersecting the axis 12. This holder 18 in turn can rotate an appropriate tool, such as a welding unit or grab, about an axis 19 perpendicular to the axis 16. Drives 20, 21, and 22 are provided at the rear end of the outrigger arm 12 for rotation about the axes 12, 16, and 19 in the manner described in my above cited copending patent application No. 326,762 filed 02 Dec. 1981 and to which reference should be made if further details of the drive are desired.

Figure 2:
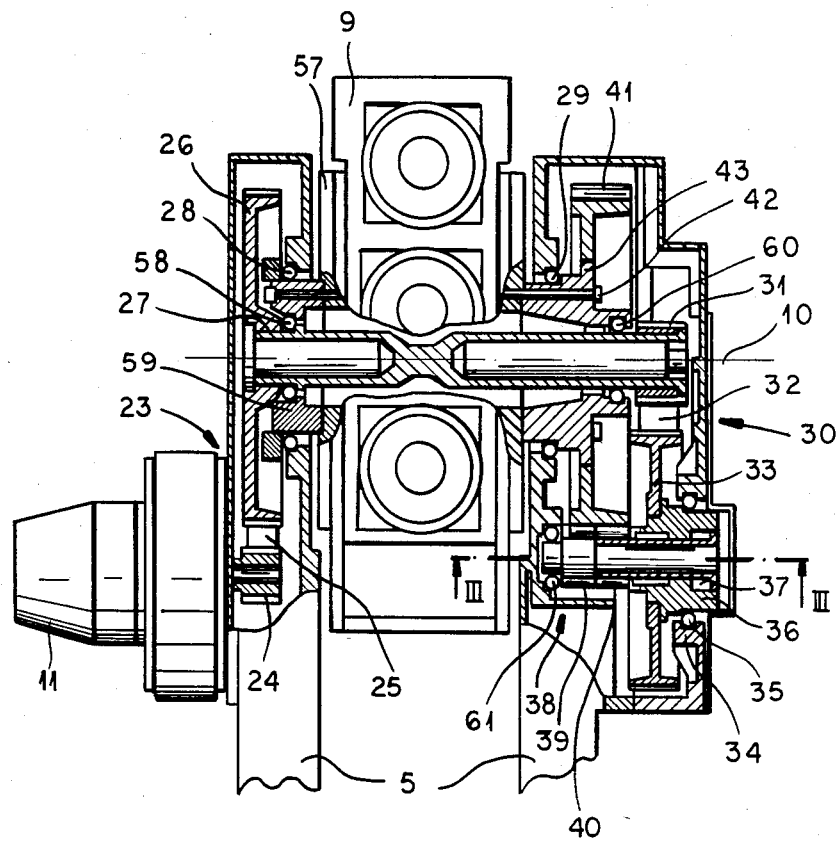
FIG. 2 is a large-scale section taken generally along line II—II of FIG. 1.
Figure 3:
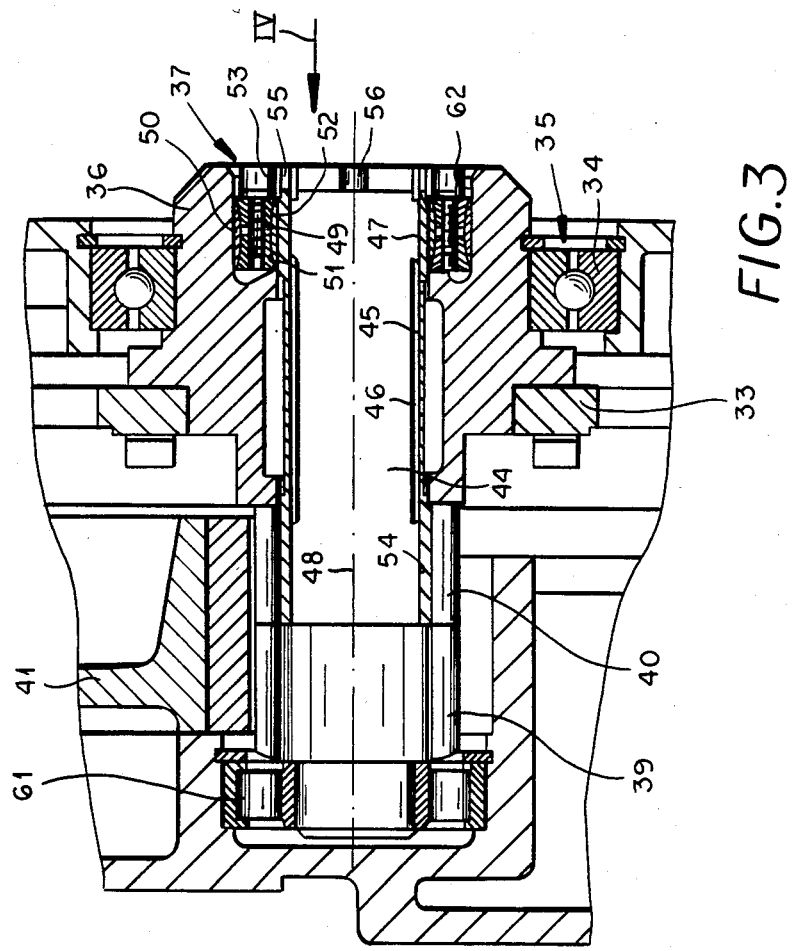
FIG. 3 is a large-scale section taken along line III—III of FIG. 2.
Figure 4:
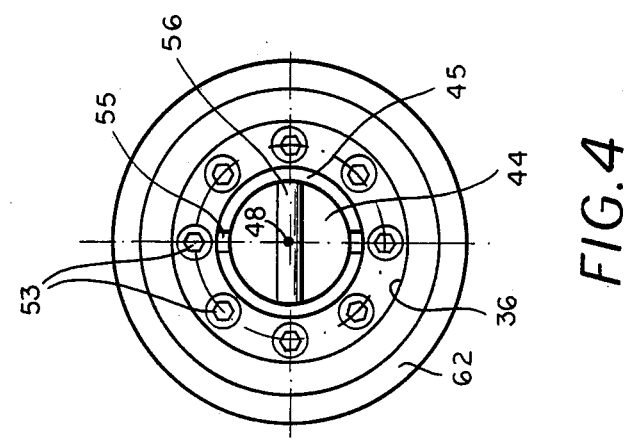
FIG. 4 is an end view taken in the direction of arrow IV of FIG. 3.

FIGS. 2, 3, and 4 illustrate the drive arrangement responsible for pivoting the outrigger arm 9 about the axis 10 on the outer end of the arm 5, which drive can be substantially identical to that used for angular movement about the axes 3 and 6 also.

This drive has a first stage 23 driven directly by the motor 11 and lying to one axial side of the arms 5 and 9, a second stage 30 driven by the first stage 23 and lying to the opposite side of the arms 5 and 9, and a third stage 38 that is driven by the stage 30, lies to the same side of the arms 5 and 9, and that is connected to the arm 9.

The first stage 23 is a so-called high torque drive and comprises a small-diameter toothed drive wheel or sprocket 24 connected via a toothed belt 25 to a large-diameter toothed wheel 26 that is fixed on a shaft 27 extending along the axis 10 through the joint of the two arms 5 and 9. This shaft 27 is fixed at one end in the input wheel 26 and is supported at this end in a roller bearing 58 fitted in a short gudgeon sleeve 59 projecting from the respective side plate 57 of the arm 9 and at the opposite end in a bearing 60 on the opposite side of the arm 9. The gudgeon sleeve 59 itself is supported via a bearing 28 in one side of the forked arm 5 for relative flexing at the axis 10. The stepdown ratio, that is the ratio of angular speeds, from the input to the output of the first stage, from gear 24 to shaft 27, is about 6:1.

The second stage 30 is also a high torque drive and has a small-diameter toothed wheel or input pulley 31 connected via another toothed belt 32 to a large-diameter toothed output wheel or pulley 33 whose hub 36 is carried in a bearing 35 whose outer race 34 is fixed in the respective side of the arm 5. The stepdown ratio of this transmission stage 30 is somewhat smaller, here 3:1 due to space considerations.

The third stage 38 comprises a small diameter input gear 39, 40 fixed to the gear 33 and a large-diameter output gear 41 whose hub 43 is secured by bolts 42 to the respective side of the arm 9. The bearing 60 supporting the shaft 27 is supported at the outer end of this hub 43 The stepdown of this transmission stage 38 is 7:1, giving a total stepdown of 126:1.

According to this invention a tensioning device 37 is provided in the hub 36 of the wheel 33. As better seen in FIGS. 3 and 4 the gear 39, 40 is split into two parts relative to its axis 48 and has a two-part axle 44, 45 comprising a solid core shaft 44 which is supported by a bearing 61 in the upper end of the arm 5 and which carries inner gear teeth 39 and a sleeve shaft 45 carrying outer gear teeth 40 and mainly received with space or play 46 around the shaft 44. The shaft 44 and sleeve 45 are coaxial and the teeth 39 and 40 are identical The sleeve 45 rides on cylindrical surfaces 47 and 54 of the shaft 44 at its inner and outer ends.

The tightener 37 is engaged between the inner surface of a cylindrical recess 62 formed in the hub 36 and the outer surface of the sleeve 45 at the surface 47. These surfaces carry respective confronting rings 49 and 50 of isosceles-triangle section and between which are engaged confronting wedge rings 51 and 52. An array of socket-head cap screws 53 are threaded into the inner wedge ring 51 and bear axially oppositely on the outer wedge ring 52. When screwed tight these screws 53 therefore pull the two rings together between the complementary rings 49 and 50, effectively compressing the sleeve 45 on the end surface 47 of the shaft 44.

In addition the sleeve 45 projects axially outward somewhat beyond the outer end of the shaft 44 and is formed with diametrally opposed slots 55 into which a twisting tool can be fitted. Similarly the outer shaft end is formed with an axially outwardly open diametral slot 56. The teeth 39 and 40 are normally set so that the slots 55 and 56 are perpendicular to each other.

The two transmission stages 23 and 30 have no slip or appreciable losses. This is possible in toothed-belt transmissions working at these speeds. Slip is eliminated in the third transmission stage 38 by relatively oppositely twisting the shaft 44 and sleeve 45 to bring the teeth 39 to press in opposite rotational senses on the teeth of the gear 41. This is done by loosening the screws 53 and then oppositely twisting the outer ends of the shaft 44 and sleeve 45 by means of the respective formations 55 and 56. The opposite torsional stresses and deformations thus imparted to the shaft 44 and sleeve 45 are held and the screws 53 are tightened, locking these stresses into the system. In this manner play can be eliminated from this last stage 38 of considerable stepdown, and the system can be tightened as it ages and wears to keep it slipless.

The principles of such playfree operation are described in some detail in the article "Spielfreie Getriebe fuer Werkzeugmaschinen" by W. Jorden in *Maschinen - Werkzeuge -Fertiqungsverfahren* (Volume 12, 1969, pages 1290ff.)

It would be possible to replace the stage 30 with a direct-mesh gear transmission like the stage 38. A similar such tightening unit 37 could also be used in such an arrangement.

With the system of this invention it is therefore possible to completely eliminate slip at the critical main joints, that is those joints closer to the stationary part of the system, responsible for the gross movements of the manipulator. Any malpositioning at these joints will be reflected at the tool in a much greater error.

I claim:

1. In a manipulator having a pair of main elements pivoted at a main axis, a drive comprising:
   a motor mounted on one of the main elements and having a motor output;
   a first belt-type stepdown transmission having
   an input wheel connected rotationally to the motor output,
   an output wheel rotatable about the axis, and
   a toothed belt interconnecting the input and output wheels for joint rotation without substantial slip;
   a second belt-type stepdown transmission having
   a toothed input wheel coaxial with and fixed rotationally on the output wheel,
   a toothed output wheel centered on a gear axis offset from the input wheel of the second transmission and connected thereto, and
   a toothed belt interconnecting the input and output wheels of the second transmission;
   a third gear-type stepdown transmission of relatively high stepdown ratio greater than that of the second transmission, mounted on the same axial side of the main elements as the second transmission, and having
   a relatively large output gear fixed rotationally to the other main element and centered on the main axis, and
   a relatively small input gear rotatable about the gear axis offset from the main axis and having two axially separate halves relatively rotatable about the gear axis and both directly meshing with the output gear;
   a shaft having an outer end connected to one of the gear halves an an inner end connected to the output element of the second transmission;
   a sleeve surrounding the shaft, having an outer end connected to the other gear half and an inner end connected to the output element of the second transmission, and of generally the same torsional elasticity between its ends as the shaft between its ends; and
   slip-adjusting means effective between the inner ends of the shaft and sleeve for maintaining opposite torsional stresses in the sleeve and shaft.

2. The manipulator drive defined in claim 1 wherein the means includes clamp means for tightening the inner ends on each other and for fixing them in the output element of the second transmission.

3. The manipulator drive defined in claim 1 wherein the means includes formations on the sleeve and shaft adapted to be engaged by torsion-inducing tools.

4. The manipulator drive defined in claim 1 wherein the inner end of the sleeve rides on the inner end of the shaft.

5. The manipulator drive defined in claim 1 wherein the first and second transmissions are axially spaced and flank the main elements, the motor being on the same axial side of the main elements as the first transmission.

6. In a manipulator having a pair of main elements pivoted together at a main axis, a drive comprising:
- a motor mounted on one of the main elements and having a motor output;
- a first belt-type stepdown transmission mounted on the one main element on one axial said thereof and having
  - an input wheel connected rotationally to the motor output,
  - an output wheel, and
  - a toothed belt interconnecting the input and output wheels for joint rotation without substantial slip;
- a second belt-type stepdown transmission mounted on the other axial side of the main elements from the first transmission and having
  - a toothed input wheel fixed rotationally on the output wheel,
  - a toothed output wheel noncoaxially associated with the input wheel of the second transmission and connected thereto, and
  - a toothed belt interconnecting the input and output wheels of the second transmission;
- a third gear-type stepdown transmission of relatively high stepdown ratio greater than that of the second transmission, mounted on the same axial side of the elements as the second transmission, and having
  - a relatively large output gear fixed rotationally to the other main element and centered on the main axis, and
  - a relatively small input gear rotatable about a gear axis offset from the main axis and having two axially separate halves relatively rotatable about the gear axis and both directly meshing with the output gear;
- a shaft having an outer end connected to one of the gear halves and an inner end connected to the output element of the second transmission;
- a sleeve surrounding the shaft, having an outer end connected to the other gear half and an inner end connected to the output element of the second transmission, and of generally the same torsional elasticity between its ends as the shaft between its ends; and
- slip-adjusting means effective between the inner ends of the shaft and sleeve for maintaining opposite torsional stresses in the sleeve and shaft.

7. In a manipulator having a pair of arms pivoted together at a main axis, a drive comprising:
- a motor mounted on one of the arms and having a motor output;
- a first belt-type stepdown transmission mounted on the one arm on one axial side thereof and having
  - an input wheel connected rotationally to the motor output and offset on the one arm from the main axis,
  - an output wheel centered on and rotatable about the main axis, and
  - a toothed belt interconnecting the input and output wheels for joint rotation without substantial slip;
- a second belt-type stepdown transmission mounted on the other axial side of the arms from the first transmission and having
  - a toothed input wheel fixed rotationally on the output wheel for joint rotation therewith about the main axis,
  - a toothed output wheel offset relative to the main axis from the input wheel of the second transmission and connected thereto, and
  - a toothed belt interconnecting the input and output wheels of the second transmission;
- a third gear-type stepdown transmission of relatively high stepdown ratio greater than that of the second transmission, mounted on the same axial said of the arms as the second transmission, and having
  - a relatively large output gear fixed rotationally to the other arm and centered on the main axis, and
  - a relatively small input gear rotatable about a gear axis offset from the main axis and having two axially separate halves relatively rotatable about the gear axis and both directly meshing with the output gear;
- a shaft having an outer end connected to one of the gear halves and an inner end connected to the output element of the second transmission;
- a sleeve surrounding the shaft, having an outer end connected to the other gear half and an inner end connected to the output element of the second transmission, and of generally the same torsional elasticity between its ends as the shaft between its ends; and
- slip-adjusting means effective between the inner ends of the shaft and sleeve for maintaining opposite torsional stresses in the sleeve and shaft.

* * * * *